Oct. 7, 1969 G. E. WILHELM ET AL 3,471,272

MAGNETIC STORAGE MEDIUM

Filed Sept. 20, 1966

INVENTORS:
George E. Wilhelm
Stanley S. Nagy
By Smyth, Roston & Pavitt
ATTORNEYS United States Patent Office 3,471,272
Patented Oct. 7, 1969

3,471,272
MAGNETIC STORAGE MEDIUM

George E. Wilhelm and Stanley S. Nagy, Studio City, Calif., assignors to Thin Film Incorporated, Los Angeles, Calif., a corporation of California Filed Sept. 20, 1966, Ser. No. 580,823
Int. Cl. G11b 5/00; C23b 5/50
U.S. Cl. 29—194 9 Claims

ABSTRACT OF THE DISCLOSURE

This invention relates to a magnetic storage medium having a heat hardened layer of a magnetic metal or alloy. The invention also relates to a method of producing such a storage medium. The invention also relates to media incorporating hard layers such as rhodium on the hardened magnetic layer and to methods of producing such media.

This invention relates to an article having a layer of electroless depositions and to methods of producing such an article. The invention particularly relates to an article heat treated to provide the electroless deposition with a hard surface. The invention also relates to an article having an aluminum surface at least partially anodized to prepare the surface of the article for an electroless deposition. The electroless deposition is particularly adapted to be a magnetic material, especially when the electroless deposition is heat treated to harden the deposition.

Electroless depositions of magnetic materials have been produced for some time on storage members such as metallic disc and cylinders to provide a storage of information in magnetic form on the members. The electroless depositions may be selected from a group including cobalt, nickel, manganese and iron. One advantage of such electroless depositions over other types of depositions such as oxide coatings is that substantially all of the material in the electroless deposition provides magnetic properties. Another advantage is that the thickness of the deposition may be relatively small and may be closely regulated so that the packing density of the signals recorded on the depositions is increased over that produced by oxide coatings.

Many of the storage members now in use have been formed from aluminum as a base member since aluminum as a base member since aluminum is light and strong. It has been difficult to deposit magnetic materials electrolessly in thin films on a metallic base member such as aluminum without producing dropouts in the depositions. These dropouts often constitute small areas where the electroless deposition has not been formed on the base member. The dropouts sometimes result from the tendency of small areas of foreign material, such as chromium or iron, on the aluminum to form alloys with the magnetic material electrolessly deposited on the storage member so as to affect the magnetic characteristics of the magnetic material. Dropouts are undesirable since they prevent or inhibit information from being recorded in magnetic form at the positions of the dropouts. As will be appreciated, even one bit of information may be crucial for certain types of recorded data such as data representing the solution of a mathematical problem since such bit of information may provide a material error in the solution of the problem.

Although it has been difficult in the past to produce electroless depositions in thin films on storage members such as discs or cylinders without any dropouts and particular storage members formed from aluminum as a base member, such dropouts have not presented problems. One reason is that the dropouts are relatively small in size. Furthermore, the thickness of the layer of magnetic material electrolessly deposited on the discs or cylinders has been relatively great so as to minimize any tendency to produce dropouts. However, this relatively great thickness of the magnetic layer has limited the packing density of the magnetic information which can be recorded on the magnetic layer and subsequently read from the magnetic layer. This has required the information storage members to be relatively large, especially when a substantial amount of informatiton has had to be recorded on the storage member.

A considerable effort has been made during the past several years to reduce the thickness of the magnetic layer electroelessly deposited on the surface of a disc or cylinder without producing any dropouts, particularly on storage members formed from aluminum as a base member. Such efforts have not been successful. This has been particulalry true since the magnetic material has had to be deposited electrolessly over an extended area on the storage member without any dropouts. By reducing the thickness of the magnetic material on the surface of the disc or cylinder, the packing density of the information recorded on the disc or cylinder could be increased and the frequency range of the signals recorded on the disc or cylinder could be correspondingly increased for a particular speed of movement of the disc past a transducing head.

The increase in the packing density of the signals recorded on the electroless deposition of such storage members as discs and cylinders has created other problems. For example, the practice now is to deposit a layer of a hard material such as rhodium over the surface of the electroless deposition so as to protect the electroless deposition. One purpose of depositing the hard material such as rhodium has been to insure that the external surface of the storage member such as the disc or cylinder will not become removed or damaged as the storage member moves past the magnetic transducing head. If the electroless deposition should become worn or damaged at any position as a result of the movement of the storage member past the magnetic transducing head, valuable information recorded in magnetic form on the head can become lost.

The deposition of a thin layer of rhodium on the external surface of the magnetic material presents certain problems. One problem is that the rhodium causes the magnetic transducing head to be spaced from the magnetic deposition so that the strength of the signals recorded on the magnetic deposition by the magnetic transducing head or reproduced from the magnetic deposition by the magnetic transducing head becomes reduced. Another difficulty has been that the humidity in the air around the storage member such as the disc or cylinder causes gases in the atmosphere such as vinyl gases to become polymerized so that a powdery material becomes deposited on the surface of the disc. This powdery material inhibits any optimium transducing action between the transfer of information in magnetic form from the head to the disc or from the disc to the head. The powdery material has also tended to damage the head over an extended period of time. Because of these difficulties, the magnetic storage member has had limitations in its magnetic properties of recording information and subsequently providing a read-out of this information.

This invention provides a storage member which overcomes the difficulties discussed above and also provides methods of producing such a storage member. One feature of this invention is the elimination of the hard layer such as rhodium by heat treating the electrolessly deposited magnetic material to harden the material. In this way the magnetic material can be disposed in contiguous relationship to the magnetic transducing head so that an optimum transducing action can be obtained between the transfer of information in magnetic form from the head to the magnetic material or from the magnetic material to the head. Furthermore, the hardening of the magnetic deposition and the resultant elimination of the rhodium layer prevent any material from being deposited on the external surface of the disc through polymerization of gases such as vinyl gases in the surrounding atmosphere.

The hardening of the magnetic deposition is effective regardless of the material used as the base member of the disc. When the disc is made from aluminum, this invention provides further features to insure that the electroless deposition is formed on the aluminum without any dropouts to affect the recording of information on the disc and the subsequent reproduction of information from the disc. As a first step, the aluminum base member is anodized for a relatively short period of time in comparison to the time required to anodize the member completely. Before the at least partially anodized base member has lost its chemical activity, a thin layer of a metal such as copper or nickel is applied to the disc. This metallic layer has properties of adhering to the anodized surface. Furthermore, the magnetic material subsequently deposited electrolessly on the base member is adhered to the anodized surface. By at least partially anodizing the aluminum surface and thereafter applying a metallic layer to the at least partially anodized surface while the surface is still active, the occurrence of dropouts on the electrolessly deposited magnetic layer has been substantially eliminated.

The anodizing process described above also has other advantages of some importance. By anodizing the aluminum disc and subsequently depositing nickel layers on the anodized surface in a manner described subsequently in detail, the nickel layers provide a barrier to prevent humidity in the air and on the hand of any person handling the disc from attacking the aluminum layer to corrode the layer. Without the nickel layers, the humidity tends to permeate through the other layers to the aluminum base material since these other layers are somewhat porous.

Figure 1:
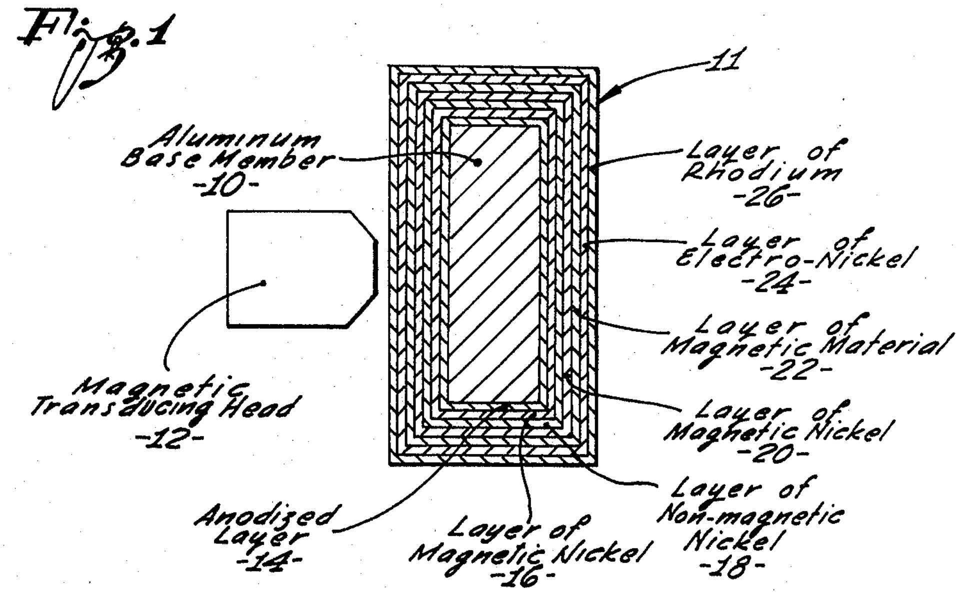
FIGURE 1 is a cross-sectional view of a storage member such as a disc constituting one embodiment of the invention; and also illustrates in schematic form a magnetic transducing head disposed in contiguous relationship to the disc.
Figure 2:
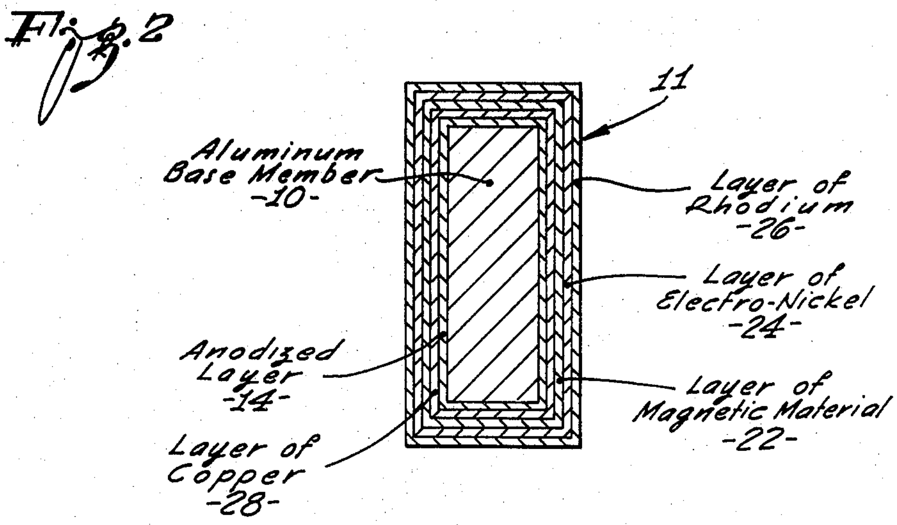
FIGURE 2 is a cross-sectional view of a storage member such as a disc constituting a second embodiment of the invention.

FIGURES 1 and 2 illustrate embodiments where aluminum constitutes a base member 10 for a storage member generally indicated at 11. The use of aluminum as a base member provides certain advantages since aluminum is light and strong. Because of its light weight, aluminum has a low inertia so that it can be quickly accelerated or decelerated to control the rate at which information is recorded on the storage member 11 and subsequently reproduced from the storage member. Because of its strength, the aluminum base member 10 does not become deformed even if it should be subjected to relatively great impact forces by a magnetic transducing head 12 as it is moved past the head.

When aluminum is used as the base member 10, an at least partially anodized layer 14 is initially formed on the base member 10. If the exposed surface of the base member 10 were to be completely anodized, the anodizing operation would normally have to proceed for a relatively long period of time such as approximately two to three hours. However, in the method constituting this invention, the anodizing operation occurs for a relatively short period of time such as a period to approximately five minutes. During this period to approximately five minutes, the exposed surface of the base member 10 is subjected to an anodizing operation in a conventional manner.

After the exposed surface of the aluminum base member 10 has been at least partially anodized as described in the previous paragraph, the anodized surface is rinsed in tap water for a relatively short period of time. This may be accomplished by allowing the tap water to run over the anodized surface for a period to approximately two minutes. The period of rinsing the anodized surface 14 is relatively short and somewhat critical since the anodized surface has properties of being chemically activated and tends to lose this property if rinsed for a relatively long period of time such as five to ten minutes.

The rinsed surface 14 is not allowed to dry after the rinsing operation since it would tend to lose its properties of chemical activity during the drying operation. In view of this, a layer 16 of a suitable metal such as copper or nickel is applied to the anodized surface while the surface is still wet. When the metal is nickel, it may be applied by an electroless deposition at ambient temperatures in a bath including nickel sulphate in a range of approximately 2% to 2½% by weight, sodium citrate in approximately 10% by weight, sodium potassium tartrate in approximately 5% by weight and sodium hypophosphite in approximately 1.3% or 1.4% by weight. Ammonia is also included in the electroless bath to maintain the pH at a value of approximately 9.

The electroless bath described in the previous paragraph is applied to the anodized surface 14 at ambient temperatures for a period of time dependent upon the thickness desired for the layer of nickel. The rate of deposition of the nickel is approximately 1 micro inch/min. Preferably the electroless deposition is applied for a period of approximately fifteen minutes so that the nickel layer 16 has a thickness of approximately 15 micro inches. The nickel in the layer 16 preferably has magnetic properties.

After the nickel layer 16 has been formed on the anodized layer 14, the nickel layer is rinsed in tap water for a relatively short period of time such as approximately thirty seconds. A layer 18 of nonmagnetic nickel is then deposited on the layer 16 of magnetic nickel. This layer 18 is preferably provided with a relatively great thickness such as a thickness in the order of 250 to 300 micro inches. The purpose of producing the nonmagnetic layer 18 of nickel is to provide a hard and nonporous layer which can be polished to a smooth finish. Since the nonmagnetic nickel is hard, dense and nonporous, it prevents humidity from passing through the external layers to the aluminum base member 10 so that the aluminum base member would tend to become corroded. Corrosion of the aluminum base member is undesirable since it adversely affects the properties of the layers of different materials on the base member. Such corrosion would result from humidity in the air and humidity on the hands of people who interchange one disc for another in the equipment in which the storage member 11 is included.

The layer 18 of nonmagnetic nickel is preferably applied by an electroless bath. This bath preferably includes nickel sulphate in approximately 4% by weight, sodium acetate in approximately 1.0% or 1.1% by weight, sodium citrate in approximately 1.1% by weight, sodium hypophosphite in approximately 2.2% by weight and a sufficient amount of ammonia and sulfuric acid to maintain a pH in the range of approximately 4.7 to 5.0. Preferably sulfuric acid having a concentration of approximately 97% is used. The electroless bath is preferably applied in a temperature range between approximately 70° and 95° C. for a period of time of approximately one hour.

As will be seen from the above discussion, the layer 16 of magnetic nickel is applied at ambient temperatures but the layer 18 of nonmagnetic nickel is applied at temperatures above ambient temperatures. One reason for applying the layer 16 of magnetic nickel before the layer 18 of nonmagnetic nickel is to insure that the exposed layer 14 of anodized aluminum is not subjected to temperatures above ambient temperatures since the anodized layer 14 tends to become passivated by relatively high temperatures even tends to become somewhat leached at these high temperatures. When the anodized layer 14 becomes passivated, the nickel layer subsequently deposited on the anodized layer does not have as good adherence to the anodized layer as the adherence of the layer 16 to the anodized layer when the layer 16 is deposited at ambient temperatures. Furthermore, the layer 16 of magnetic nickel is deposited by an electroless bath having a pH of 9. With a relatively low value of pH (representing an acid) or a very high value of pH (representing a strong alkali), aluminum surfaces can be chemically attacked. This would prevent a uniform deposition of magnetic material from being subsequently applied to the storage member so that the storage member would not be substantially uniform in its magnetic characteristics at different positions.

After the deposition of the layer 18 of nonmagnetic nickel, the storage member is rinsed in tap water for a relatively short period of time such as approximately thirty seconds to one minute and is subsequently dried. The external surface of the layer 18 is then polished to produce a smooth finish and the surface is reactivated. A degreaser is then applied to the surface of the layer 18 to remove any oil residue on the surface from the polishing operation. A suitable degreaser may be obtained from Enthone, Incorporated, of New Haven, Conn., and is designated by that company as Emulsion Cleaner 75. This material constitutes a hydrocarbon which dissolves grease and includes an emulsion so that the hydrocarbon, the grease and the emulsion can be removed by rinsing with water. The degreaser is applied at room temperature for a suitable period of time such as between forty-five seconds and five minutes.

The external surface of the layer 18 is then rinsed in tap water for a suitable period to approximately two minutes but is not subsequently dried. The storage member is then subjected to any alkali cleaner which is nonsilicated, a suitable one constituting a product of Enthone. The alkali cleaner is applied for a suitable period of time such as sixty seconds at a particular temperature such as approximately 60° C. The alkali cleaner eliminates from the external surface of the layer 18 any film such as a hydrocarbon residue.

The storage member is again rinsed in tap water for a suitable period to approximately two minutes but is not dried. The storage member is then subjected to a relatively weak acidic bath such as a bath containing approximately 2% sulfuric acid. The weak solution of sulfuric acid is applied at ambient temperatures for a relatively short period of time such as thirty seconds. The weak concentration of sulfuric acid tends to activate the exposed surface of the nickel layer 18. The storage member is then rinsed, first with tap water for a suitable period such as approximately one minute and then with de-ionized water for a suitable period such as approximately one minute. Both rinsings occur at ambient temperatures. The storage member is not dried after the rinsing operations.

A layer 20 of magnetic nickel is thereafter applied as by an electroless bath to the activated surface of the layer 18. The electroless bath may be substantially the same as that used to apply the layer 16 of magnetic nickel. The bath may be applied for a suitable period of time such as approximately five to ten minutes such that the layer 20 has a thickness in the order of approximately 5 to 10 micro inches. The layer 20 of magnetic nickel is deposited on the layer 18 of nonmagnetic nickel to insure that the layer of magnetic material subsequently applied to the storage member will adhere to the nickel and will have a uniform thickness. As previously discussed, a uniform layer of magnetic material is important to insure that the storage member will have substantially uniform magnetic characteristics at each position.

The storage member 11 is subsequently rinsed in tap water and thereafter in de-ionized water for a suitable period of time, such as approximately one minute in the tap water and approximately one minute in the de-ionized water. An electroless plating bath containing suitable magnetic materials is then applied to the storage member to obtain a deposition of the magnetic material on the surface of the storage member. As will be appreciated from the prior art, the magnetic materials employed in the bath may vary and the percentages of these materials may also vary on the basis of the properties desired for the deposition of magnetic material. This deposition of magnetic material is illustrated in FIGURE 1 at 22 and may be obtained from one or more of the materials in a group consisting of cobalt, nickel, iron and manganese. In one particular electroless bath, the following materials were used:

| Material | Percentage by weight |
|---|---|
| Sodium citrate | 10 |
| Sodium potassium tartrate | 5 |
| Versene (complexing agent salt) | 1.6 |
| Sodium hypophosphite | 1.6 |
| Manganese sulphate | 1.6 |
| Cobalt sulphate | 4 |
| Ammonia hydroxide, sufficient to create a pH of approx. 9. | |

In the electroless bath specified in the previous paragraph, "Versene" is the tetrasodium salt of ethylenediaminetetraacetic acid. The hypophosphite salt in the electroless bath specified in the previous paragraph and in the electroless baths used in prior steps described above constitutes a reducing agent to reduce the metallic salts to a metal for deposition on the layer 20 of nickel. The citrate and tartrate salts serve as complexing agents to maintain in solution the salts of the magnetic materials in the plating bath for reduction by the hypophosphite ions. The citrate and tartrate salts also serve as buffers. Versene also serves as a complexing agent, and the ammonia acts to maintain the pH of the solution within particular limits such as between 8 and 10. The electroless bath is applied at a suitable temperature such as a temperature between approximately 70° C. and 80° C. This bath is instrumental in depositing the cobalt and manganese constituting the magnetic materials at a particular rate such as 2 micro inches per minute. The thickness of the magnetic layer 22 is dependent in part upon the particular magnetic properties desired for the storage member 11 and in part upon the temperature of the bath. Preferably the layer 22 of magnetic material has a thickness in the order of 5 to 10 micro inches.

After the application of the magnetic layer 22, the storage member is dried, polished and cleaned with an alkali cleaner similar to that described above. The storage member is then rinsed and subjected to a bath of a weak solution of an acid such as sulfuric acid in a manner similar to that described above if a rhodium layer is to be subsequently deposited on the magnetic layer 22. This bath is applied for a suitable period of time such as approximately ten seconds to activate the exposed surface of the magnetic layer 22. The storage member is subsequently rinsed and plated with a layer 24 of an electro-nickel (Watts nickel) in a solution containing nickel sulphate in a concentration of approximately 30% by weight, nickel chloride in a concentration of approximately 4% by weight and boric acid in a concentration of approximately 4% by weight, the remainder of the solution constituting water. The electro-nickel constitutes a low-stress nickel which is able to receive the deposition of rhodium which is subsequently applied to the storage member. The plating occurs at a suitable temperature such as a temperature of approximately 50° C. for a suitable period of time such as a period between approximately 1 and 5 minutes. The deposition of the layer 24 of Watts nickel may constitute a novel feature of this invention.

After the formation of the layer 24 of electro-nickel, the storage member is rinsed and subjected once again to the weak solution of acid such as one containing approximately 2% of sulfuric acid. The storage member is again rinsed and is thereafter subjected to a deposition as by electro-plating of any suitable rhodium solution such as one obtained from Engelhardt Industries. This electro-plating of rhodium occurs at a particular temperature such as approximately 45° C. for a suitable period of time such as a period between approximately one to five minutes. The storage member 11 is rinsed and dried after the formation of the layer 26 of rhodium.

The layer of rhodium is illustrated at 26 in FIGURE 1. It operates to provide a hard external surface for the storage member to protect the layer 22 of magnetic material from being removed or becoming worn during the movement of the storage member past the transducing head 12. As will be appreciated, the transducing head 12 is generally separated by only a few micro inches from the storage member so that there is a tendency at times for the head to contact the storage member and remove or damage the layer 22 of magnetic material without the protection of the hard layer 26 of rhodium. The rhodium also acts as a lubricant for the head 12 so that the relative movement between the storage member and the head is facilitated. The storage member is rinsed and dried after the formation of the layer 26 of rhodium.

The storage member 11 described above has certain important advantages. It is light and strong and has a substantially uniform deposition of a magnetic material in a thin layer without any dropouts. Because of this, the storage member can be used to record information in magnetic form at high packing densities without any loss in any bit or bits of such information during the recording operation. Since all of the information is recorded on the storage member at high packing densities, the size of the storage member can be reduced for a particular amount of information to be recorded and subsequently read or the amount of information recorded on the storage member can be increased for a storage member of a particular size. For example, with a thickness of approximately 10 micro inches for the layer 22 of magnetic material, a packing density of approximately 5,000 bits per inch has been obtained, and signals have been able to be recorded at a frequency of approximately 3 megacycles with a coercive force of approximately 500 oersteds and a retentivity of approximately 10,000 gauss. This is in contrast to the prior art where the layer of magnetic material has been deposited with a thickness of approximately 30 micro inches so that the packing density has been only approximately 2,000 bits per inch and signals have been able to be recorded on the magnetic layer with a frequency of only one megacycle at a coercive force of approximately 500 oersteds and a retentivity of approximately 9,000 gauss FIGURE 2 illustrates another embodiment of the invention. In this embodiment, the layers 16, 18 and 20 of nickel are replaced by a single layer 28 of copper. The copper is applied on the anodized layer 14 as by electro-plating. The copper may be a pyrophosphate copper obtained from M. & T. Chemicals, Inc., of Rahway, N.J. This copper is described in Sheet No. P–CU–10–SVC published by M. & T. Chemicals, Inc., in May 1963. The electro-plating may occur for a suitable period of time such as between approximately five and thirty minutes dependent upon the thickness of the copper desired. After the application of the copper by electro-plating as described above, the layer 22 of magnetic material is subsequently applied in the manner described above, and the layer 24 of electro-nickel and the layer 26 of rhodium may thereafter be applied in the manner described above.

Figure 3:
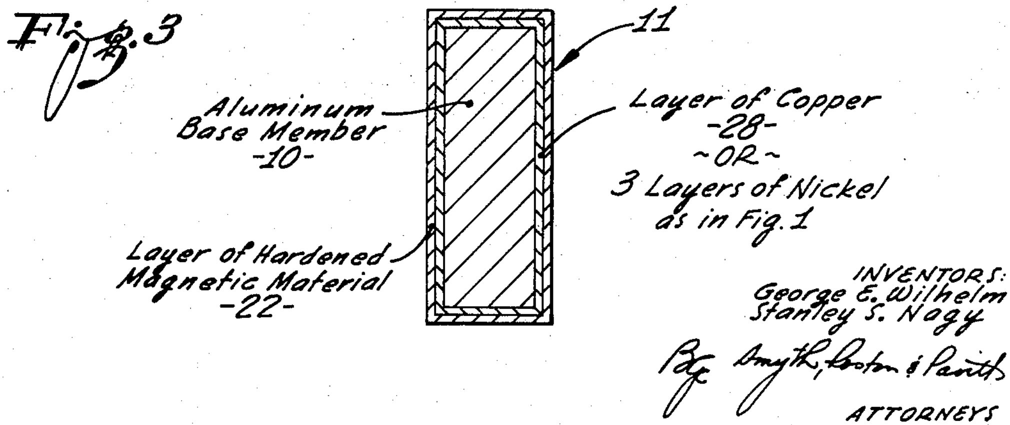
FIGURE 3 is a cross-sectional view of a storage member such as disc constituting a third embodiment of the invention.

FIGURE 3 illustrates a storage member constituting another feature of the invention. In the embodiment shown in FIGURE 3, the layer 24 of electro-nickel and the layer 26 of rhodium are eliminated so that the layer 22 of magnetic material becomes exposed. The layer 22 of magnetic material is hardened as by heat treating to insure that it will not become removed or impaired by contact with the head 22 as the storage member is moved past the head. By way of illustration, the storage member including the layer 22 of magnetic material may be heat treated at a suitable temperature such as approximtely 650° F. for a particular period of time such as approximately five hours. The heat treating may occur in a vacuum or in an atmosphere of inert gas such as argon to inhibit any oxidation of the layer 22 of magnetic material. If any oxidation of the layer 22 of magnetic material should occur, this oxidation can be eliminated by polishing the exposed surface of the layer lightly.

When the layer 22 of magnetic material becomes heat treated, the Rockwell hardness of the magnetic layer becomes considerably increased. This increased value of Rockwell hardness for the magnetic layer 22 may even be greater than the value provided by the rhodium layer 26. By hardening the layer 22 of magnetic material, the layer does not become damaged or impaired or worn by contact or impact with the head 12. Furthermore, the magnetic characteristics of the layer 22 of magnetic material do not become materially changed by the heat treating so that the packing density of the information on the magnetic material is still quite great and the material still has a relatively high value of coercivity and still has a relatively high value of retentivity.

When the storage member is formed by heat treating the layer 22 of magnetic material, the storage member can still include the layer 28 of copper as shown in FIGURE 2. If desired, a layer of palladium can be deposited on the layer of copper in a conventional manner before the layer 22 of magnetic material is deposited. If nickel is used, however, in place of copper as the material covering the anodized layer 14, the three layers 16, 18 and 20 shown in FIGURE 1 are still preferably applied.

By heat treating the magnetic layer 22 to harden the layer, certain important advantages are obtained. One advantage results from the disposition of the magnetic layer 22 in contiguous relationship to the head 12 without any nonmagnetic layers such as the rhodium layer 26 between it and the head. Because of this, signals of enhanced amplitude are recorded on the magnetic layer 22. Furthermore, by eliminating the rhodium layer 26, any tendency for a layer of gases polymerized from the atmosphere to accumulate on the exposed surface of the storage member 11 becomes minimized.

As will be seen, there are two different features of this invention. One involves the anodizing of aluminum on a controlled basis to provide for an adherence of successive layers of material to the base member. The other involves the heat treatment of the layer of magnetic material to harden this layer so that additional layers of hard materials such as rhodium can be eliminated. It will be appreciated that the use of one of these features is not related to the use of the other feature although storage members should preferably incorporate both of these features.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. An article for storing information in magnetic form and for subsequently providing for a reading of this information during relative movement of the article and a magnetic head, including, a base surface, a thin layer of a particular metal on the base surface, and a thing layer of magnetic metal or alloy deposited on the particular metal, at least the surface of the magnetic metal or alloy being heat hardened thereby being substantially harder than the normal hardness of such deposited magnetic metal or alloy to resist wear by the magnetic head during relative movement between the magnetic material and the magnetic head.

2. The article set forth in claim 1 wherein the magnetic metal or alloy is selected from a group consisting of nickel, cobalt, iron, manganese and alloys thereof, and wherein the particular metal is selected from a group consisting of copper and nickel.

3. The article set forth in claim 2 wherein the thin layer of magnetic metal or alloy has been electrolessly deposited on the thin layer of the particular metal.

4. An article for storing information in magnetic form and for subsequently providing for a reading of this information during relative movement of the article and a magnetic head, including, an aluminum base surface, a thin, at least partially anodized layer of aluminum on the aluminum base surface, a thin layer of a particular metal on the at least partially anodized layer of aluminum, and a layer of magnetic metal or alloy deposited on the particular metal, the layer of magnetic metal or alloy being heat hardened thereby being substantially harder than the normal hardness of such deposited magnetic metal or alloy to resist wear by the magnetic head during relative movement between the magnetic material and the magnetic head.

5. The article set forth in claim 7 wherein the layer of magnetic metal or alloy is selected from a group consisting of nickel, cobalt, iron, manganese, and alloys thereof.

6. The article set forth in claim 5 wherein the particular metal is selected from a group consisting of copper and nickel.

7. An article for storing information in magnetic form and for subsequently providing for a reading of this information during relative movement of the article and a magnetic head, including, an aluminum base surface, a thin, at least partially anodized layer on the layer of aluminum, a first thin layer of magnetic nickel on the at least partially anodized layer, a thin layer of nonmagnetic nickel on the first thin layer of magnetic nickel, a second thin layer of magnetic nickel on the layer of nonmagnetic nickel, and a thin layer of magnetic metal or alloy deposited on the second thin layer of magnetic nickel.

8. The article set forth in claim 7 wherein the thin layer of magnetic metal or alloy is hardened to resist wear by the magnetic head during relative movement between the magnetic material and the magnetic head.

9. The article set forth in claim 7, including, a thin layer of Watts nickel on the thin layer of magnetic metal or alloy, and a thin layer of rhodium on the thin layer of Watts nickel.

References Cited

UNITED STATES PATENTS

| | | | |
|---|---|---|---|
| 3,019,125 | 1/1962 | Eggenberger et al. | 340—174 X |
| 3,098,803 | 7/1963 | Godycki et al. | 340—174 X |
| 3,327,297 | 6/1967 | Croll | 340—174 |
| 3,393,982 | 7/1968 | Fisher et al. | 29—194 |

L. DEWAYNE RUTLEDGE, Primary Examiner

E. L. WEISE, Assistant Examiner

U.S. Cl. X.R.

29—195, 196, 196.6, 198, 199; 117—71, 130; 204—29.38, 40